United States Patent
Huang

[19]

[11] Patent Number: 6,118,488
[45] Date of Patent: Sep. 12, 2000

[54] METHOD AND APPARATUS FOR ADAPTIVE EDGE-BASED SCAN LINE INTERPOLATION USING 1-D PIXEL ARRAY MOTION DETECTION

[75] Inventor: Chien Hsiu Huang, Tainan Hsien, Taiwan

[73] Assignee: Silicon Integrated Systems Corporation, Hsinchu, Taiwan

[21] Appl. No.: 09/144,316

[22] Filed: Aug. 31, 1998

[51] Int. Cl.[7] .................................................. H04N 7/01
[52] U.S. Cl. ........................................ 348/452; 348/448
[58] Field of Search .................................. 348/452, 448, 348/458, 699, 700, 581; 345/154

[56] References Cited

U.S. PATENT DOCUMENTS

| | | | |
|---|---|---|---|
| 4,731,648 | 3/1988 | Bernard .................................. | 348/452 |
| 4,845,557 | 7/1989 | Lang ...................................... | 348/452 |
| 4,947,251 | 8/1990 | Hentschel .............................. | 348/452 |
| 5,019,903 | 5/1991 | Dougall et al. . | |
| 5,339,109 | 8/1994 | Hong . | |
| 5,347,314 | 9/1994 | Faroudja ............................... | 348/452 |
| 5,410,356 | 4/1995 | Kikuchi ................................. | 348/452 |
| 5,473,383 | 12/1995 | Sezan et al. . | |
| 5,532,751 | 7/1996 | Lui . | |
| 5,592,231 | 1/1997 | Clatanoff et al. . | |
| 5,619,273 | 4/1997 | Sugiyama ............................. | 348/452 |
| 5,631,706 | 5/1997 | Tsunashima ......................... | 348/452 |
| 5,936,676 | 8/1999 | Ledinh et al. ....................... | 348/452 |

Primary Examiner—Victor R. Kostak
Attorney, Agent, or Firm—Merchant & Gould P.C.

[57] ABSTRACT

The present invention generally relates to the conversion of a picture data in an interlaced format to a progressive format, and more particularly, to an adaptive edge-based scan line interpolation method and apparatus for improving the picture quality in a display system. The present invention provides a method and apparatus for converting interlaced scanning images to progressive images by using simple motion detection procedure and adaptive edge-interpolation. Therefore, the present invention is capable of performing the interlaced-to-progressive conversion with less hardware and buffer cost. Besides, the present invention performs the motion detection by examining the 1-D (one-dimension) pixel array at the adjacent fields. Therefore, the computation of the interlaced-to-progressive conversion of the present invention is less complex than the prior art. Furthermore, the video image of the present invention has a sharper video image with edge preservation and flicker reduction.

19 Claims, 5 Drawing Sheets received order at decoder    I0  P3  B1  B2  P6  B4  B5  P9  B7  B8  P12  B10  B11  P15

TV sequence    I0  B1  B2  P3  B4  B5  P6  B7  B8  P9  B10  B11

| Mem1 | Mem2 | Mem3 | Mem4 |
|------|------|------|------|
| I0   | B1   | B2   | P3   |
| P6   | B4   | B5   | P9   |
| P12  | B7   | B8   | P15  |
|      | B10  | B11  |      |
|      | B12  | B13  |      |

METHOD AND APPARATUS FOR ADAPTIVE EDGE-BASED SCAN LINE INTERPOLATION USING 1-D PIXEL ARRAY MOTION DETECTION

FIELD OF THE INVENTION

The present invention generally relates to the conversion of a picture data in an interlaced format to a progressive format, and more particularly, to an adaptive edge-based scan line interpolation method and apparatus for improving the picture quality in a display system.

BACKGROUND OF THE INVENTION

As well known, NTSC color television systems adopted an interlaced scanning system to reduce the transmission bandwidth requirements. The interlaced scanning video displays half of each frame (called a field) every 1/60 second, followed by the other field 1/60 second later. Referring to FIG. 1, it illustrates the interlaced scanning video format with a top field and a bottom field of the prior art. The top field contains all the odd-numbered horizontal lines, and the bottom field contains all the even-numbered lines. However, the interlaced scanning manner has drawbacks of visual artifacts, including edge flicker, shimmering and diagonal jaggedness. Deinterlacing can overcome above problems to improve the appearance of the interlaced scanning video by converting the interlaced scanning video format into a progressive scanning format. Besides, many applications, such as PC displays, projection and high-definition television employ progressive-scan technology. To convert the interlaced scanning pictures to progressive scanning pictures, the missing lines of each field (for example, the even-numbered lines in the top field or the odd numbered lines in the bottom field) are generated from the interlaced scanning video signals.

One method for the interlaced-to-progressive conversion is a static technique that uses the same overall conversion regardless of the image sources or contents. This method uses the techniques of line replication, vertical filtering and field merging. Line replication repeats each horizontal line in a field to create a complete frame. Vertical filtering creates missing lines by filtering a number of nearby lines. Field merging takes lines from the previous field and inserts them into the current field to construct the frame. However, these approaches result in visual artifacts such as serrated edges for motion objects in the video frame.

To overcome these drawbacks, adaptive deinterlacing techniques are developed. Such adaptive deinterlacing techniques use motion analysis to select the optimum method for different parts of the image. Adaptive deinterlacing techniques first check both the current and one or more previous fields to determine the motion contents. In image sequences with little or no motion, missing lines take pixels values from the previous field. If there is a significant motion, an edge adaptive spatial interpolation method is used to construct the missing lines.

However, the above-mentioned approaches using adaptive interlacing techniques have complex computation procedure to determine the motion contents and interpolate the missing pixels values. U.S. Pat. No. 5,019,903 describes a technique which only considers how to interpolate the missing pixels without details to the motion detection circuit. U.S. Pat. No. 5,473,383 uses extra buffers to store the signals representative of the motion signals. U.S. Pat. No. 5,592,231 uses a median filter to select motion signal and applies five-edge interpolations. U.S. Pat. No. 5,532,751 uses two fields in the same frame to detect motion. U.S. Pat. No. 5,339,109 uses three-edge interpolation without order but does not consider the sharpness of the edges. However, the improper edge interpolation will blur the image.

SUMMARY OF THE INVENTION

To overcome the aforementioned problems, the present invention provides a method for converting interlaced scanning images to progressive images by using simple motion detection procedure and adaptive edge-interpolation. Therefore, it is an object of the present invention to implement the interlaced-to-progressive conversion with less hardware and buffer cost. The present invention performs the motion detection by examining the 1-D (one-dimension) pixel array at the adjacent fields. If the missing pixel is found to be steady portion of the image, its value is replaced by the corresponding value at the field immediately preceded. Otherwise, if the image has motion in the part of the missing pixels, the missing pixel value is interpolated by the adaptive edge-interpolation. The adaptive edge-interpolation interpolates the missing pixel along the edge direction that is the minimum of the three edges crossing the missing pixel. With respect to the videos with MPEG-2 (Moving Picture Expert Groups-2) format, the present invention also provides a memory organization for interlace-to-progressive conversion to minimize the buffer requirement. Therefore, the present invention has a sharper video image with edge preservation and flicker reduction and has simple computation and low buffer cost since only 1-D pixel array is examined to determine the motion signal.

BRIEF DESCRIPTION OF THE DRAWINGS

For a more complete understanding of the present invention and the advantages thereof, reference is now made to the following descriptions taken in conjunction with the accompanying drawings which illustrate one or more embodiments of the present invention, wherein.

DETAILED DESCRIPTION OF THE PREFERRED EMBODIMENTS

Figure 1:
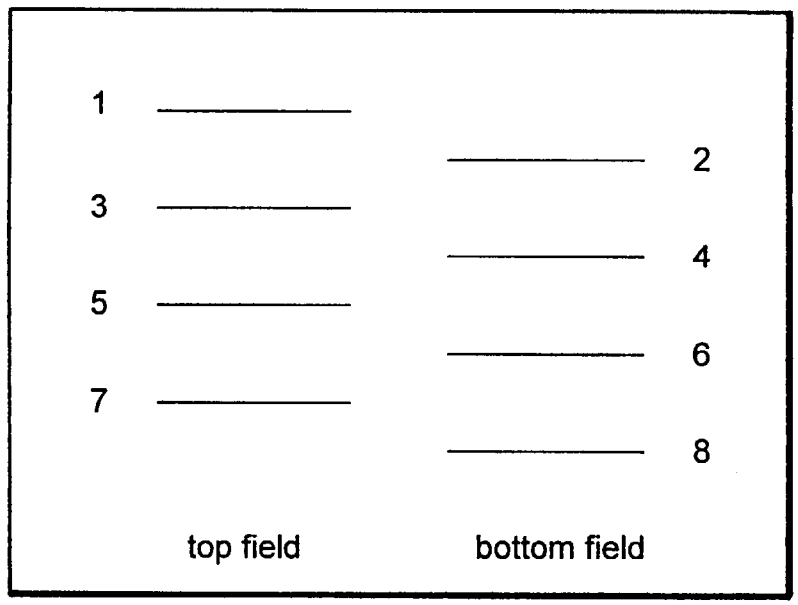
FIG. 1 illustrates the format of the interlaced scanning video image of the prior art.
Figure 2:
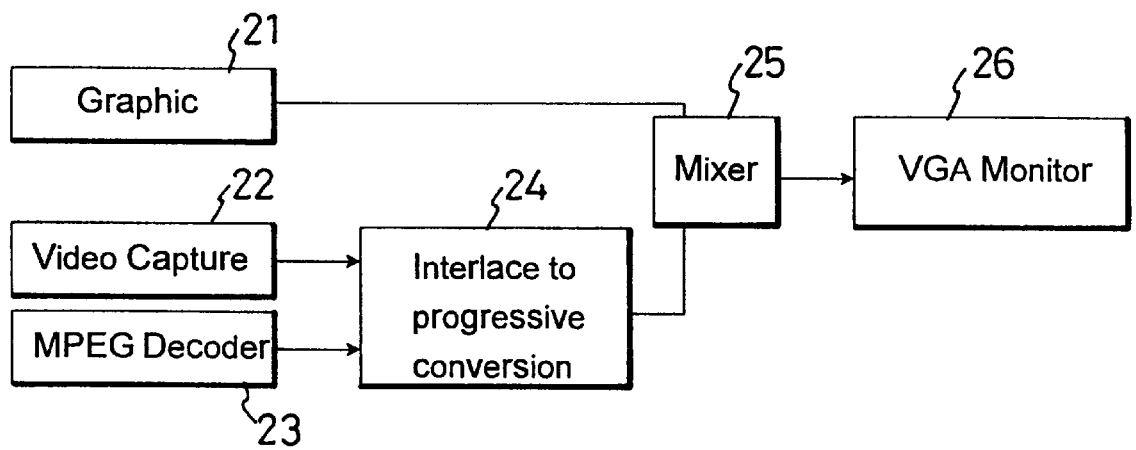
FIG. 2 illustrates the block diagram of the preferred embodiment of the interlace-to-progressive conversion of the present invention.

Referring to FIG. 2, it illustrates the block diagram of the preferred embodiment of the interlace-to-progressive conversion of the present invention. The video signal format from either the video capture (22) or the decoded MPEG video (23) is an interlaced format. To simultaneously display the interlaced video signal format (22 or 23) and progressive VGA graphic signal (21) on a progressive monitor like VGA monitor (26), the interlaced signals (22 or 23) are converted to the progressive format by an interlace-to-progressive conversion (24). The converted video signal is then mixed with the graphic signal (21) by a mixer (25) and then displays on a VGA monitor (26).

Figure 3:
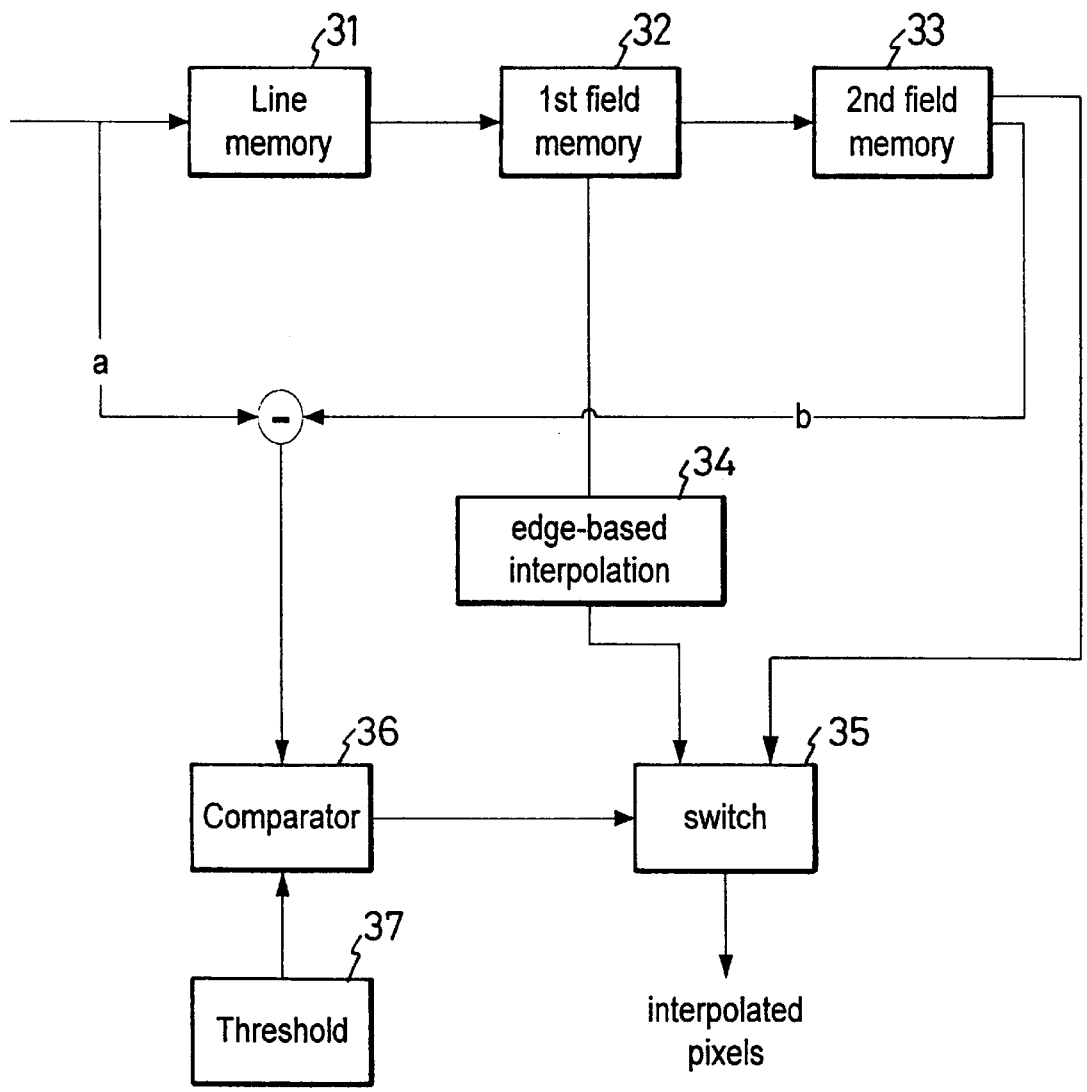
FIG. 3 illustrates the block diagram of the adaptive edge-based interlace-to--progressive conversion of the present invention.

Referring to FIG. 3, it illustrates the block diagram of the adaptive edge-based interlace-to-progressive conversion of the present invention. For each pixel in the lines to be interpolated in field i, where i denote a field of a first polarity (32), motion detection is first employed to determine whether the pixel is in the motion region of the image by comparing the |a-b| with the predetermined threshold (37) by a comparator (36). The comparing result is determined by a switch (35) whether a field merging or an edge-based interpolation is used to generate the pixel value.

The motion detection mechanism uses the two consecutive fields i−1 and i+1 that immediately precede and follow field i, where i−1 and i+1 denotes fields of a second polarity (33). That is to say, when i corresponds to the bottom field, fields i−1 and i+1 are consecutive top fields; and when i corresponds to the top field, fields i−1 and i+1 are consecutive bottom fields.

Figure 4:
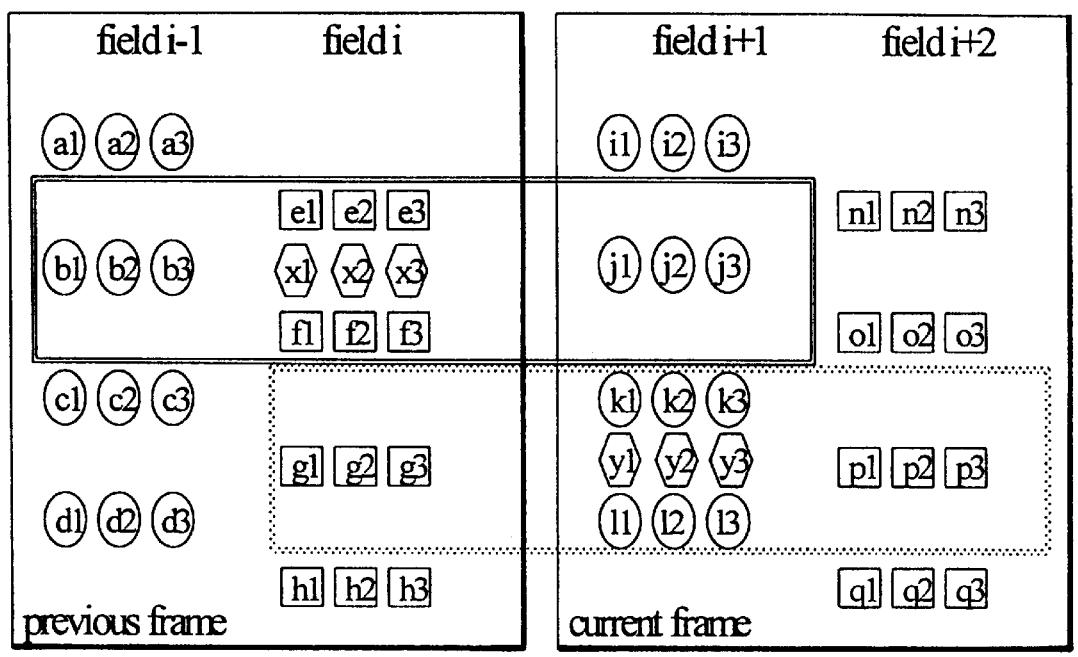
FIG. 4 illustrates a graphical example of the process to determine a motion signal of the present invention.

Referring to FIG. 4, it illustrates an non-limited graphical example to determine the motion signal for the missing pixel x2 of the present invention. The motion signal is detected by examining the contents of an 1-D pixel array (three pixels in this example) from field i−1 that immediately precedes and field i+1 that immediately follows field i. For example, with respect to the missing pixel x2, the corresponding three-pixel array in field i−1 consists of pixels b1, b2 and b3 and the corresponding three-pixel array in field i+1 consists of pixels j1, j2 and j3. A sum of absolute difference between the two pixel arrays is generated according to the equation as follows:

$$det=|j1-b1|+|j2-b2|+|j3-b3| \qquad (1)$$

This sum signal det is compared with a threshold value. If the sum signal is smaller than the threshold value, then the pixel x2 is assumed to be in the steady portion of the image. The pixel value of x2 is replaced by the value of corresponding pixel b2 in the field i−1. If the sum signal exceeds than the threshold value, then it is concluded that there is an effective relative image motion in this part of the image. The pixel value of x2 is estimated by edge-interpolation.

Figure 5:
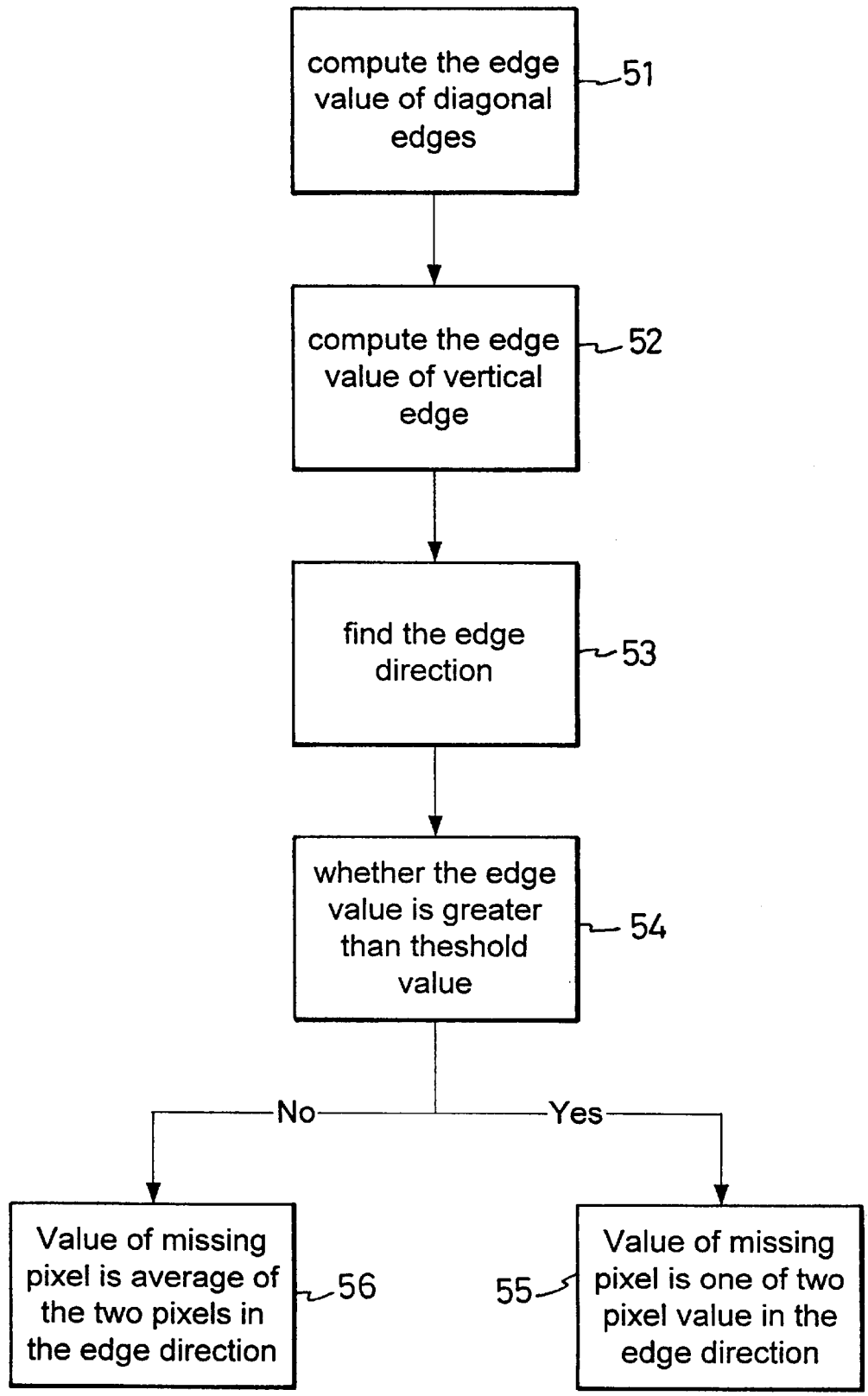
FIG. 5 illustrates the block diagram of the flow chart of the adaptive edge interpolation of the present invention.

To reduce the computation cost, the edge-interpolation method of the present invention considers three edges that cross the missing pixel. For example, with respect to the missing pixel x2, the three edges are the vertical edge e2–f2 and diagonal edges e1–f3 and e3–f1. Referring to FIG. 5, it illustrates the flow chart of the adaptive edge interpolation. The edge values of the diagonal edges e1–f3 and e3–f1 are first computed (51), then the edge value of the vertical edge e2–f2 is computed (52). The edge direction is selected to be the minimum of the three absolute values of the difference, i.e. |e1–f3|, |e2–f2| and |e3–f1|. If two or more edges have the same minimum absolute value of the difference, the edge direction is selected to be the edge that was last computed and has minimum value (53).

After the edge direction is found, the missing pixel is determined by comparing the edge value with a threshold value (54). If the edge value is greater than a threshold value (55), the value of the missing pixel x2 is one of the two pixel values in the edge direction and a shaper edge exists. Therefore, no interpolation is performed to ensure the sharper edge is not blurred due to interpolation. The value of missing pixel x2 is interpolated to be the equally weighted sum of the two pixel values (the average of the two pixel values) in the edge direction if the edge value is less than a threshold value (56). For example, if the edge direction is e2–f2 and its edge value is less than the threshold value, the value of the missing pixel x2 is equal to (e2+f2)/2. If the edge value in the edge direction is greater than the threshold value, the value of the missing pixel x2 is equal to either one of the two pixels in the edge direction. For example, if the edge direction is e2–f2 and its edge value is greater than the threshold value, the value of the missing pixel x2 is equal to the value of pixel e2 or f2.

Figures 6, 7, 8:
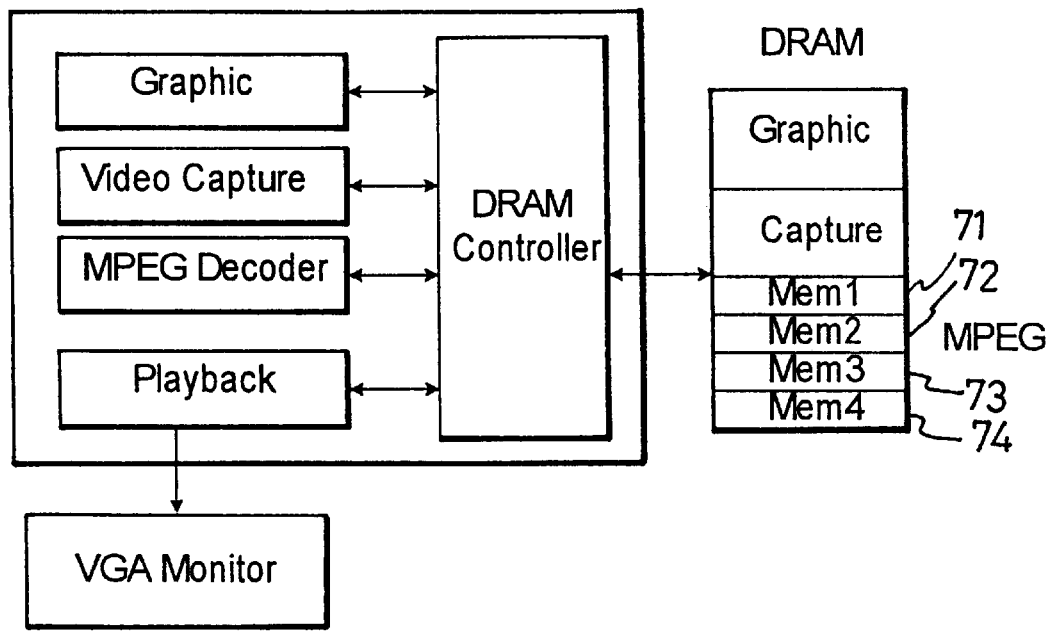
FIG. 6 illustrates a graphical example of a MPEG (Moving Picture Expert Groups) video sequence for interlace-to-progressive conversion of the present invention.
FIG. 7 illustrates the block diagram of the preferred embodiment of the memory organization of the present invention for the MPEG video format.
FIG. 8 illustrates a graphical example of the memory content updating process for the MPEG video format.

For a video signal with MPEG (Moving Picture Expert Groups) format, the buffers required by the interlace-to-progressive conversion are shared with MPEG decoder since the interlace-to-progressive conversion occurs after the MPEG decoding process as illustrated in FIG. 2. Referring to FIG. 6, it illustrates a graphical example of a MPEG video sequence for the interlace-to-progressive conversion of the present invention. Each I-, B- and P- picture consists of top field and bottom field. As shown in FIG. 6, the display order is similar to the TV sequence. When only two consecutive B-pictures exist between I- and P-pictures, which occurs in most of the MPEG video stream, four memory blocks are used to meet the buffer requirements. Referring to FIG. 7, it illustrates the preferred embodiment of the memory organization of the present invention for the MPEG video format. Four memory blocks are used for the memory organization. Two blocks are for the interlace-to-progressive conversion and two blocks are for storing the MPEG picture data to be decoded Referring to FIG. 8, it illustrates a graphical example of memory content updating process for FIG. 6 of the present invention. MEM1 (71) and MEM4 (74) blocks are for I-picture and P-picture, and MEM2 (72) and MEM3 (73) blocks are for B-pictures, respectively. New I-, P- and B-pictures are stored in the corresponding blocks for that type of picture in their display order. As illustrated in FIG. 8, when a new frame picture is received, the old picture in the corresponding memory block is replaced by the new picture. For example, when P6 is received, the data of I0 is replaced by P6.

As illustrated in FIG. 8, the three consecutive fields used in the interlace-to-progressive conversion process for MPEG video format are from two consecutive pictures in the display order if the consecutive B-picture numbers are not greater than two. For example, to interpolate top field of B2, B1 and B2 are used as reference pictures. If the consecutive B-picture numbers are greater than two, one of the memory blocks that stores B-picture is used to store the newly decoded data. Therefore, the interpolation of bottom field of B-pictures in MEM2 (72) uses top field in MEM4 (74) if MEM3 (73) are used for storing decoded picture data, and the interpolation of top field of B-pictures in MEM3 (73) uses bottom field in MEM1 (71) if MEM2 (72) are used for storing decoded picture data.

The present invention provides a method and mechanism for converting interlaced scanning images to progressive images by using simple motion detection procedure and adaptive edge-interpolation. Therefore, the present invention is capable of performing the interlaced-to-progressive conversion with less hardware and buffer cost. Besides, the present invention performs the motion detection by examining the 1-D (one-dimension) pixel array at the adjacent fields. Therefore, the computation of the present invention is less complex than the prior art. Furthermore, the video image of the present invention has a sharper video image with edge preservation and flicker reduction.

Although the present invention and its advantage have been described in detail, it should be understood that various changes, substitutions and alternations can be made herein without departing from the spirit and scope of the invention as defined by the appended claims.

What is claimed is:

1. A method for generating a progressive scanning video image, comprising the steps of:
   (a) selecting a first 1-D pixel array in a first image field and a second 1-D pixel array in a second image field;
   (b) computing a value between said first and second array by comparing the sum of the absolute value of the difference between said first and second array with a predetermined threshold value; and
   (c) determining an interpolated pixel value according to said value obtained in step (b) and interpolating said interpolated pixel value into an interlaced video image to be converted to the progressive scanning video image.

2. The method as claimed in claim 1, wherein the contents of said 1-D pixel arrays are the pixels at the corresponding image lines of interpolated pixel.

3. The method as claimed in claim 1, wherein no motion between said first and second array has occurred if said sum of the absolute value of the difference between said first and second array is less than said predetermined threshold value.

4. The method as claimed in claim 1, wherein a motion between said first and second array has occurred if the said sum of the absolute value of the difference between said first and second array is greater than said predetermined threshold value.

5. The method as claimed in claim 1, wherein said interpolated pixel value is replaced by the value of the corresponding pixel at said first image field if there is no motion between said first and second array.

6. The method as claimed in claim 1, wherein said interpolated pixel value is predicted by edge-based interpolation if there is a motion between said first and second array.

7. The method as claimed in claim 6, wherein said prediction of said interpolated pixel value further comprises the steps of:
   (d) calculating values of $|x(k)-y(-k)|$, wherein $x(k)$ is the value of the pixel at the image line above the interpolated pixel at the same field, and k is equal to $-N, \ldots -2, -1, 1, 2 \ldots, N$, and $y(k)$ is the value of the pixel at the image line below the interpolated pixel at the same field;
   (e) calculating the value of $|x(0)-y(0)|$;
   (f) determining an edge direction by selecting the minimum value of said values of $|x(k)-y(-k)|$, wherein $k=-N, \ldots, -1, 0, 1, \ldots N$; and
   (g) determining the value of a missing pixel by comparing said values obtained from steps of (d) and (e) with a predetermined threshold value.

8. The method as claimed in claim 7, wherein the value of said missing pixel is one of said pixel values in said edge direction if the value of said edge direction is greater than said predetermined threshold value.

9. The method as claimed in claim 7, wherein the value of said missing pixel is an average of said pixel values in said edge direction if the value of said edge direction is less than said predetermined threshold value.

10. The method as claimed in claim 7, wherein the pixel pair that was lastly computed is chosen to predict said missing pixel value if two or more values of $|x(k)-y(-k)|$ are the same.

11. An apparatus for generating a progressive scanning video image, comprising:
    a first 1-D pixel array in a first image field for storing pixels at the corresponding image lines of the pixel to be interpolated;
    a second 1-D pixel array in a second image field for storing pixels at the corresponding image lines of the pixel to be interpolated;
    a comparator connected to said 1-D pixel arrays for comparing the sum of the absolute value of the difference between said first and second array with a predetermined threshold value and generating a value; and
    an interpolated means for interpolating an interpolated pixel value according to said value.

12. The apparatus as claimed in claim 11, wherein no motion between said first and second array has occurred if said sum of the absolute value of the difference between said first and second array is less than said predetermined threshold value.

13. The apparatus as claimed in claim 11, wherein a motion between said first and second array has occurred if the said sum of the absolute value of the difference between said first and second array is greater than said predetermined threshold value.

14. The apparatus as claimed in claim 11, wherein said interpolated pixel value is replaced by the value of the corresponding pixel at said first image field if there is no motion between said first and second array.

15. The apparatus as claimed in claim 11, wherein said interpolated pixel value is predicted by edge-based interpolation if there is a motion between said first and second array.

16. The apparatus as claimed in claim 15, further comprising:
    a means for calculating values of $|x(k)-y(-k)|$, wherein $x(k)$ is the value of the pixel at the image line above the interpolated pixel at the same field, and k is equal to $-N, \ldots -2, -1, 1, 2 \ldots, N$, and $y(k)$ is the value of the pixel at the image line below the interpolated pixel at the same field;
    a means for calculating the value of $|x(0)-y(0)|$;
    a means for determining an edge direction by selecting the minimum value of said values of $|x(k)-y(-k)|$, wherein $k=-N, \ldots, -1, 0, 1, \ldots N$; and
    a comparison means for determining the value of a missing pixel by comparing said values with a predetermined threshold value.

17. The apparatus as claimed in claim 16, wherein the value of said missing pixel is one of said pixel values in said edge direction if the value of said edge direction is greater than said predetermined threshold value.

18. The apparatus as claimed in claim 16, wherein the value of said missing pixel is an average of said pixel values in said edge direction if the value of said edge direction is less than said predetermined threshold value.

19. The apparatus as claimed in claim 16, wherein the pixel pair that was lastly computed is chosen to predict said missing pixel value if two or more values of $|x(k)-y(-k)|$ are the same.

* * * * *